(12) United States Patent
Cebry

(10) Patent No.: US 7,369,420 B2
(45) Date of Patent: May 6, 2008

(54) CONTROL CIRCUIT FOR ISOLATED FORWARD DC-TO DC CONVERTERS

(75) Inventor: George L. Cebry, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 202 days.

(21) Appl. No.: 11/286,365

(22) Filed: Nov. 23, 2005

(65) Prior Publication Data

US 2007/0115698 A1  May 24, 2007

(51) Int. Cl.
*H02M 3/24* (2006.01)
*H02M 3/335* (2006.01)

(52) U.S. Cl. .................................. 363/97; 363/21.01

(58) Field of Classification Search ............ 363/16, 363/20, 21.01, 21.04, 21.06–21.1, 95, 97, 363/131

See application file for complete search history.

(56) References Cited

U.S. PATENT DOCUMENTS

| | | | | |
|---|---|---|---|---|
| 4,468,723 A | * | 8/1984 | Hughes | 363/82 |
| 5,719,755 A | * | 2/1998 | Usui | 363/19 |
| 6,122,180 A | * | 9/2000 | Seo et al. | 363/21.17 |
| 6,366,376 B1 | * | 4/2002 | Miyata et al. | 398/79 |
| 6,519,165 B2 | * | 2/2003 | Koike | 363/21.12 |
| 6,542,388 B2 | * | 4/2003 | Amei | 363/56.01 |
| 6,816,395 B2 | * | 11/2004 | Kobori et al. | 363/97 |
| 7,035,119 B2 | * | 4/2006 | Koike | 363/19 |

* cited by examiner

*Primary Examiner*—Matthew V. Nguyen
(74) *Attorney, Agent, or Firm*—Ingrassia Fisher & Lorenz

(57) ABSTRACT

An isolated DC-to-DC converter comprises a converter section configured to receive an input voltage and produce an isolated output voltage and a controller section configured to control the operation of the converter section to maintain the output voltage at a predetermined value by, at least in part, turning switches on and off at a certain duty cycle at a set switching frequency. The controller section comprises an isolation transformer providing primary and secondary side isolation and an error amplifier having an output coupled to the isolation transformer, the error amplifier providing an error signal that is representative of the difference between an output voltage and a desired output voltage. The converter further comprises an isolation driver coupled to an isolation driver switch, the isolation driver operable to turn on and off the isolation driver switch at the same frequency as the converter section, the switching of the isolation driver switch resulting in the error signal becoming an amplitude modulated error signal that is transferred across the isolation transformer.

13 Claims, 2 Drawing Sheets

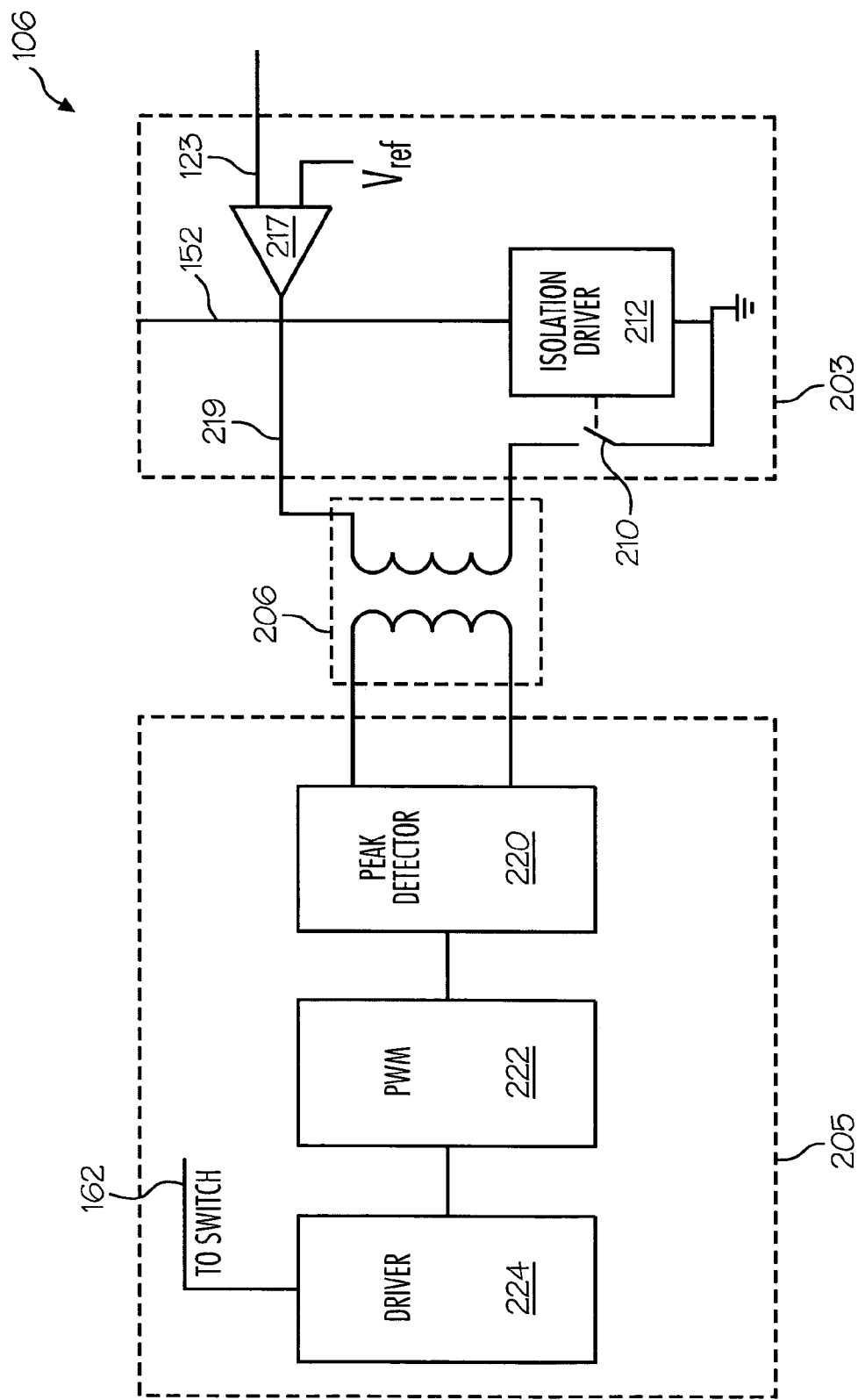

US 7,369,420 B2

CONTROL CIRCUIT FOR ISOLATED FORWARD DC-TO DC CONVERTERS

FIELD OF THE INVENTION

The present invention generally relates to a control circuit, and more particularly to a control circuit for isolated forward DC-to-DC converters.

BACKGROUND OF THE INVENTION

DC-to-DC converters change DC electrical power from one voltage level to another. Typically, a DC-to-DC converter converts a supply voltage level of DC power to an output voltage level. For example, 1.5 volts DC from a battery can be stepped up to a higher voltage to operate electronic circuitry. DC-to-DC converters can also provide noise isolation, power bus regulation, etc.

There are various types of DC-to-DC converters including buck converters, boost converters, buck-boost converters, and "Cuk" converters. The buck converters and the boost converters step the input voltage down and up, respectively, and buck-boost converters and Cuk converters can either step the input voltage up or down.

Different designs for DC-to-DC converters exist. Certain DC-to-DC converters have the input ground of a primary side isolated from the output ground of a secondary side, typically using an isolation transformer. Typically, isolation is provided for safety reasons and to prevent current ground loops. One drawback of isolated power supplies is that when the power supply utilizes primary side switching to produce the output voltage, feeding back the output voltage from the secondary side to the primary side to drive a controller on the primary side can be problematic.

Accordingly, it is desirable to provide a control circuit for a DC-to-DC power converter having lossless or near lossless switching and very few parts to reduce cost. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one exemplary embodiment of the invention, an isolated DC-to-DC converter comprises a converter section configured to receive an input voltage and produce an output voltage and a controller section configured to control the operation of the converter section to maintain the output voltage at a predetermined value by, at least in part, turning switches on and off at a certain switching frequency with a variable duty cycle. The controller section comprises an isolation transformer providing primary and secondary side isolation and an error amplifier having an output coupled to the isolation transformer, the error amplifier providing an error signal that is representative of the difference between an output voltage and a desired output voltage. The converter further comprises an isolation driver coupled to an isolation driver switch, the isolation driver operable to turn on and off the isolation driver switch at the same frequency as the converter section, the switching of the isolation driver switch resulting in the error signal becoming an amplitude modulated error signal that is transferred across the isolation transformer.

In another exemplary embodiment, a method for controlling the output voltage of a DC-to-DC voltage converter comprising a converter section and a control section includes a step of determining an error signal representative of a variance between an output voltage and a desired output voltage. Next, an isolation switch is driven at a frequency determined by a switching frequency from the converter section. Then, an amplitude modulation version of the error signal is transmitted through an isolation transformer. The error signal is retrieved at a peak detector by filtering the amplitude modulated version.

In another embodiment, a controller for controller the output voltage of an isolated DC-to-DC converter comprises an isolation transformer providing isolation of a primary side and a secondary side. An error amplifier on the secondary side has an output coupled to the isolation transformer and provides an error signal representative of a difference between an output voltage of the DC-to-DC converter and a desired output voltage. An isolation driver on the secondary side coupled to an isolation driver switch and the isolation driver is operable to switch the isolation driver switch at the switching frequency of a converter switch of the isolated DC-to DC converter. The switching of the isolation driver switch resulting in the error signal being amplitude modulated and transferred across the isolation transformer to the primary side.

BRIEF DESCRIPTION OF THE DRAWINGS

The present invention will hereinafter be described in conjunction with the following drawing figures, wherein like numerals denote like elements, and:

FIG. 2 is an exemplary embodiment of a feedback circuit and control section in accordance with an exemplary embodiment of the present invention.

DETAILED DESCRIPTION OF THE INVENTION

Figure 1:
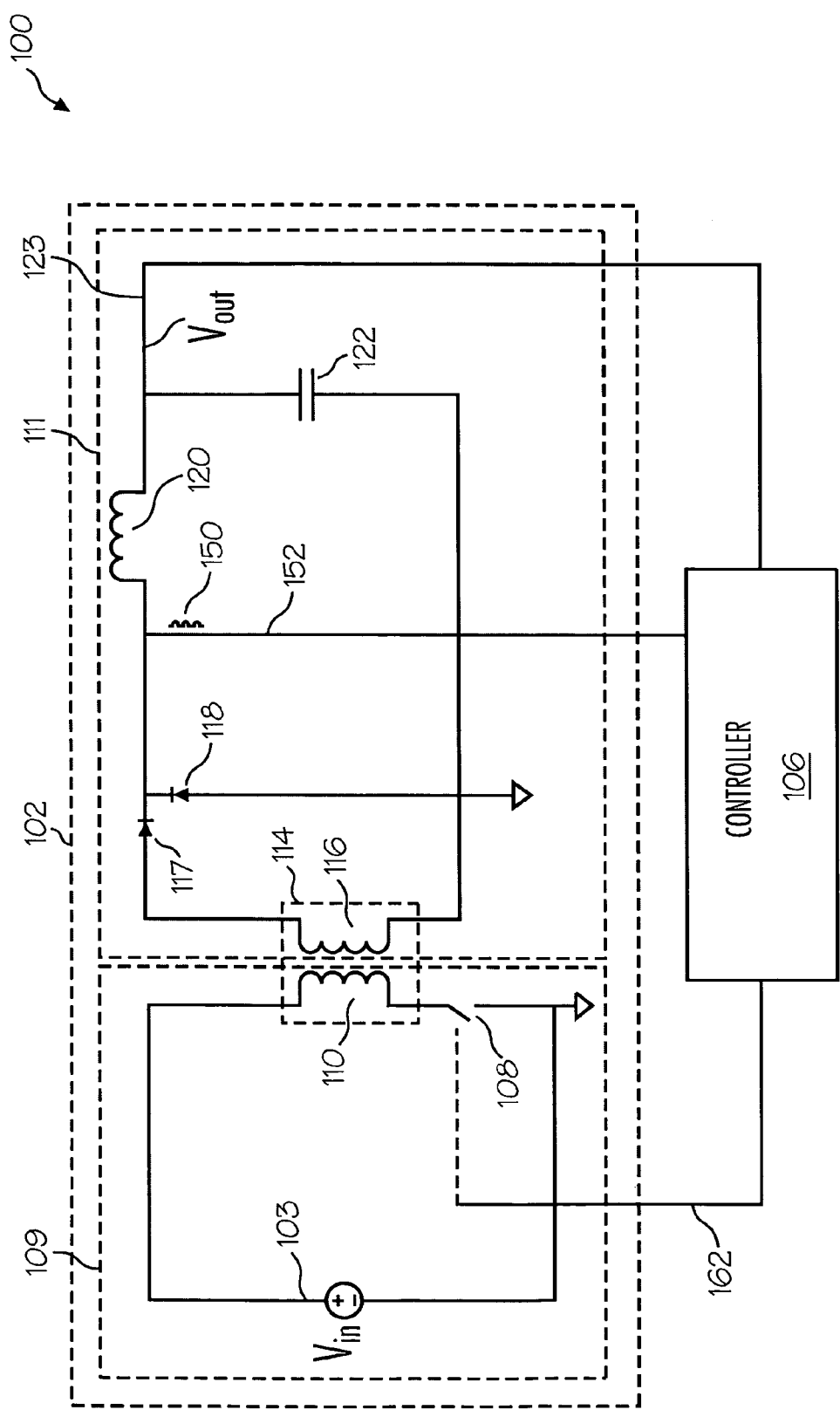
FIG. 1 illustrates an exemplary forward DC-to-DC power converter in accordance with an exemplary embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

FIG. 1 illustrates an exemplary isolated DC-to-DC power converter 100, which comprises a converter section 102 coupled to a controller section 106.

Converter section 102, in the exemplary embodiment of FIG. 1, receives an input voltage ($V_{in}$) at an input terminal 103 and produces an output voltage ($V_{out}$) at an output terminal 123. Converter section 102, in one exemplary embodiment, comprises a primary section 109 and a secondary section 111 coupled by a transformer 114. Primary section 109 comprises the input terminal 103 coupled to a switch 108, which is coupled to a primary side windings 110 of the transformer 114. Secondary section 111 comprises secondary side windings 116 of transformer 114. Secondary section 111 further includes a first diode 117 coupled to the secondary side windings 116 and a second diode 118. Secondary section 111 further includes a secondary inductor 120 and a capacitor 122 coupled to the output terminal 123.

In the exemplary embodiment as shown in FIG. 1, DC-to-DC converter 100 is an isolated buck converter. The present invention is not limited to buck converters but can be used with any isolated converter requiring the feedback of a secondary side reference, such as an output voltage, to the primary side. These can include isolated boost converters, isolated buck-boost converters, isolated Cuk converters, and the like. Additionally, the components as shown can change. For example, switch 108 can be a transistor switch, such as a MOSFET transistor switch, or any other controllable switch. In certain embodiments, switches can replace the diodes on the secondary section.

The controller section 106 receives a signal from the secondary side representing a parameter that can be used to generate a control signal 162 that can be used to control the behavior of switches in the primary section 109 and/or the secondary section 111, such as switch 108. When the converter section 102 is controlled using a voltage control scheme or a current controlled scheme, the secondary side parameter can be the output voltage, $V_{out}$. Controller section 106 also receives a switching signal 150 from a line connection 152 coupled between the secondary section 111 and the controller section 106. Using the switching signal 150 that is already present in most DC-to-DC converters eliminates the need to use additional circuitry to generate this signal, thus reducing overall part count and cost of the converter.

Considering the operation of the converter section 102, when switch 108 is in the "on" state, the switch 108 acts as a short causing the input voltage to appear across the primary side windings 110 and the secondary side windings 116. First diode 117 is forward bias and the second diode 118 is reverse bias causing the energy to be transferred to the output terminal 123 as the output voltage, $V_{out}$.

When switch 108 is in the "off" state, current in the primary side windings 110 stops flowing. The magnetic field across the primary side windings 110 collapses and reverses in polarity. First diode 117 is then reverse bias and second diode 118 is forward bias as current flows from the secondary inductor 120 through the second diode 118. The voltage across the secondary inductor 120 is equal to the output voltage less a diode drop. In the exemplary embodiment the ratio of the number of windings in the primary side windings, $N_p$, to the number of windings in the secondary side windings, $N_s$, establishes the final voltage output.

The output voltage also depends on the ratio of on-off cycling of switch 108, known as the duty cycle, D. Thus, the output voltage depends on the input voltage, transformer turns ratio and duty cycle:

$$V_{out} = V_{in}\left(\frac{N_s}{N_p}\right)D.$$

A PWM (pictured in FIG. 2) of the controller section 106 controls the switching and duty cycle of the switch 108. If the input voltage varies, the controller can alter the duty cycle of the switch 108 to compensate for the variance. However, in an isolated DC-to-DC power converter 100 this can require that a controller primary side (illustrated in FIG. 2 as element 205) of the controller 106 receive an isolated feedback of the output voltage 123, or a value based on the output voltage, from a controller secondary side (illustrated in FIG. 2 as element 203) of the controller 106.

An exemplary embodiment of a controller configured to provide for feedback of an error signal over an isolation transformer is illustrated in FIG. 2. FIG. 2 illustrates an exemplary embodiment of the controller section 106 comprises the controller primary side 205 and the controller secondary side 203. As discussed previously, isolation is often needed between the primary and secondary sections of a DC-to-DC converter. The controller secondary side 203 includes an error amplifier 217, an isolation transformer 206, and an isolation driver switch 210 coupled to an isolation driver 212. The isolation driver 212 receives the switching signal 150 from line connection 152, which is coupled to converter section 102. The switching signal 150 is based on the switching frequency of the switch 108.

The controller primary side 203 includes a peak detector 220 coupled to a pulse width modulator 222 that is coupled to a driver circuit 224. Driver circuit 224 outputs control signals 162 to switch 108 in the converter section 102.

In operation, the error amplifier 217 of the controller secondary side 203 receives, in one exemplary embodiment, the output voltage, $V_{OUT}$, from the output terminal 123 of the converter section 102. The error amplifier 217 compares the output voltage, $V_{OUT}$, to a reference voltage, $V_{REF}$, to produce an error signal 219 comprising a DC value representative of the difference between the output voltage, $V_{OUT}$, and the reference voltage, $V_{REF}$. The isolation driver 212 receives the switching signal 150 from the converter section 102. The switching signal 150 comprises a set frequency produced by the switching frequency of one or more switches or diodes, such as diodes 117 and 118. The switching signal 150 causes the isolation driver controller to switch the isolation driver switch 210 between open and close at the same frequency as the switching frequency of the switch 108 in the converter section 102. The switching action amplitude modulates the error signal 219, which is then sent across the isolation transformer 206 to the peak detector 220 of the controller primary side 205. The peak detector 220 behaves like a low pass filter to filter out the switching frequency and to retrieve the error signal 219. The output of the peak detector 220 is used by the pulse width modulator 222 to produce a high or low signal that can be used by the driver circuit 224 to produce the control signal 162 to turn the switch 108 to an "on" or "off" state. The signal outputted by the pulse width modulator 222 is used to increase or decrease the duty cycle of the switch 108 to adjust for changes in the voltage output and other variations in the DC to DC converter that affect output voltage regulation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed

1. An isolated DC-to-DC converter comprising:
  a converter section comprising:
    a voltage input for receiving an input voltage;
    a voltage output for outputting an output voltage;
    a converter switch configured to turn on and off at a switching frequency to provide, at least in part, the output voltage; and
  a controller section coupled to the converter section, the controller section comprising:

an isolation transformer providing isolation of a primary side and a secondary side;

an error amplifier on the secondary side having an output connected to a terminal of the isolation transformer, the error amplifier providing an error signal that is representative of a difference between the output voltage and a desired output voltage; and an isolation driver on the secondary side coupled to an isolation driver switch, the isolation driver operable to receive a switching signal representative of the switching frequency of the converter switch, the isolation driver further configured to switch the isolation driver switch using the switching signal, the switching of the isolation driver switch resulting in the error signal being transferred across the isolation transformer to the primary side.

2. The converter of claim 1, wherein the converter is a forward converter.

3. The converter of claim 1, wherein the controller section further comprises a peak amplitude detector coupled to the isolation transformer, the peak amplitude detector operable to recover the error signal.

4. The converter of claim 3 wherein the peak amplitude detector recovers the error signal via application of a low pass filter.

5. The converter of claim 3 further comprising a pulse width modulator circuit configured to receive the error signal from the peak amplitude detector, to compare the error signal to a reference wave form and to output a pulse width modulator output comprising a logical high or a logical low based on the comparison.

6. The converter of claim 5 further comprising a switch driver coupled to the pulse width modulator circuit and configured to generate a control signal for the converter switch from the pulse width modulator output.

7. The converter of claim 6 wherein the switch driver is a MOSFET driver coupled to a MOSFET switch on the primary side.

8. A controller for controller the output voltage of an isolated DC-to-DC converter comprising:

an isolation transformer providing isolation of a primary side and a secondary side;

an error amplifier on the secondary side having an output connected to a terminal of the isolation transformer, the error amplifier providing an error signal that is representative of a difference between an output voltage of the DC-to-DC converter and a desired output voltage; and an isolation driver on the secondary side coupled to an isolation driver switch, the isolation driver operable to receive a switching signal from a converter switch of the isolated DC-to DC converter and to switch the isolation driver switch at the switching frequency of the switching signal, the switching of the isolation driver switch resulting in the error signal being amplitude modulated and transferred across the isolation transformer to the primary side.

9. The controller of claim 8 further comprising a peak amplitude detector coupled to the isolation transformer, the peak amplitude detector operable to recover the error signal from the amplitude modulated error signal.

10. The controller of claim 9 wherein the peak amplitude detector recovers the error signal via application of a low pass filter to the amplitude modulated error signal.

11. The controller of claim 9 further comprising a pulse width modulator circuit, the pulse width modulator circuit configured to receive the error signal from the peak amplitude detector, to compare the error signal to a reference wave form and to output a pulse width modulator output comprising a logical high or a logical low based on the comparison.

12. The controller of claim 11 further comprising a switch driver coupled to the pulse width modulator circuit and configured to generate a control signal for the converter switch from the pulse width modulator output.

13. The controller of claim 12 wherein the switch driver is a MOSFET driver coupled to a MOSFET switch on the primary side.

* * * * *